United States Patent [19]
Macken

[11] Patent Number: 4,480,169
[45] Date of Patent: Oct. 30, 1984

[54] NON CONTACT LASER ENGRAVING APPARATUS

[76] Inventor: John A. Macken, P.O. Box 696, Santa Rosa, Calif. 95402

[21] Appl. No.: 417,049

[22] Filed: Sep. 13, 1982

[51] Int. Cl.$^3$ .............................................. B23K 27/00
[52] U.S. Cl. ........................ 219/121 LH; 219/121 LJ; 219/121 LQ; 219/121 LR; 219/121 LW
[58] Field of Search .................. 219/121 LH, 121 LJ, 219/121 LW, 121 LR, 121 LQ, 121 LP; 346/76 L, 108; 355/47–49, 66; 358/285, 292, 293

[56] References Cited

U.S. PATENT DOCUMENTS 3,370,504 2/1968 Buck et al. ........................... 358/292
3,739,088 6/1973 Landsman .................. 219/121 LJ X

OTHER PUBLICATIONS

Tibbetts, *IBM Technical Disclosure Bulletin*, "Simplified Optical Unit for A Page Scanner," vol. 8, No. 6, Nov. 1965, p. 885.

*Primary Examiner*—C. L. Albritton
*Attorney, Agent, or Firm*—Edward E. Roberts

[57] ABSTRACT

A non-contact laser engraving apparatus for reproducing on a workpiece an image, the image being formed on or in proximate relationship to a specularly reflecting surface of a cyclindrical mirror being scanned laterally by a laser beam with the mirror in a focal plane. The image is formed of a diffusely reflective substance with the beam then being appropriately brought to a focus at the workpiece. Translation mechanism are provided for providing relative movement between the workpiece and the image for recreating the image as an engraving in the workpiece. Several embodiments are illustrated utilizing mirrors or lenses or a combination of both for providing the scanning and focusing functions of the apparatus.

12 Claims, 4 Drawing Figures

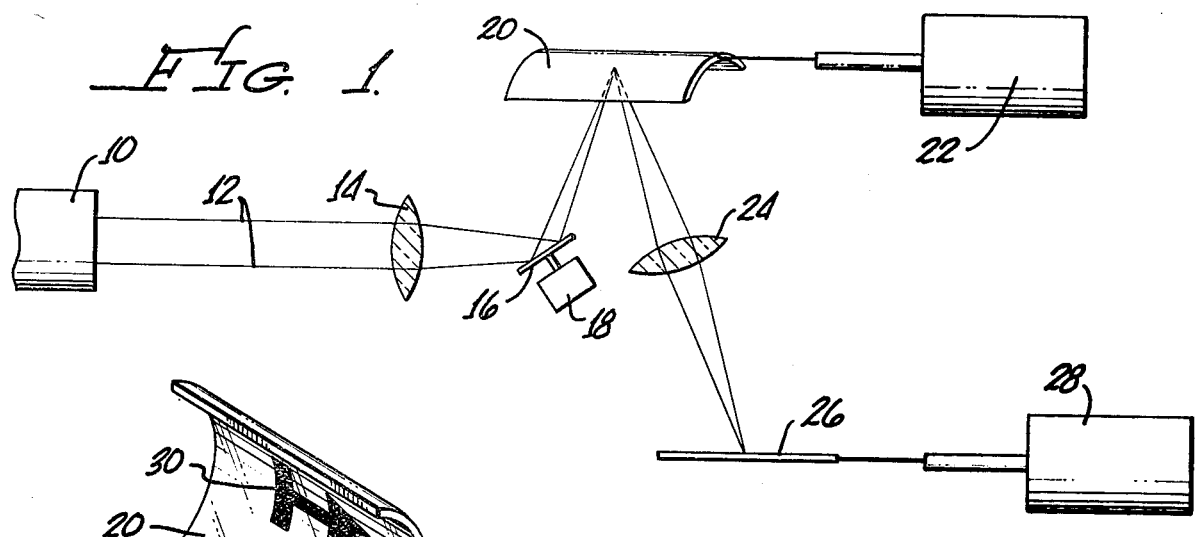
FIG. 1.
FIG. 2.
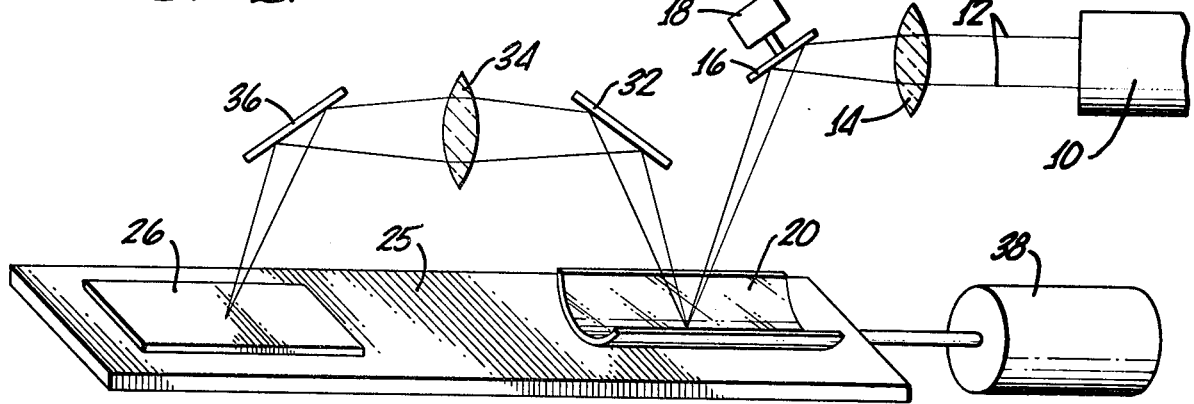
FIG. 3.
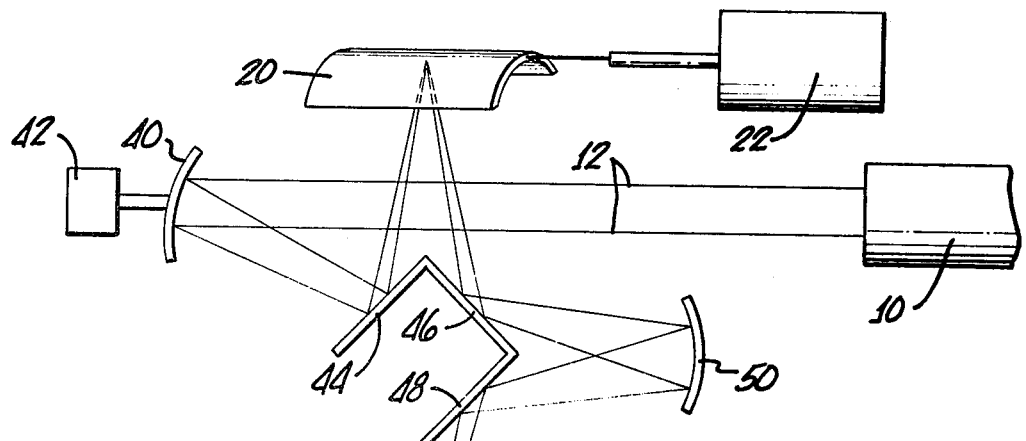
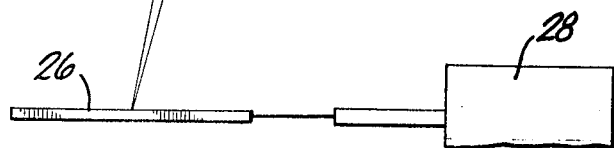
FIG. 4.

NON CONTACT LASER ENGRAVING APPARATUS

BACKGROUND OF THE INVENTION

The background of the invention will be discussed in two parts:

1. Field of the Invention

This invention relates to laser apparatus, and more particularly to non contact laser engraving apparatus for producing laser engraved images in organic materials such as wood, plastic and paper.

2. Description of the Prior Art

The use of laser apparatus for producing engraved or carved images in a workpiece, such as wood, paper or the like is fairly common. Such laser apparatus ordinarily employs a carbon dioxide laser or the like with means for focusing the beam to a power density of 30,000 watts/square centimeter, this focused beam being scanned over the workpiece, upon which is typically placed a stencilled template. This template has an image in the form of openings therein. The laser beam is then scanned over the entire area of the template, and in the open areas thereof, the laser beam strikes the workpiece causing vaporization of the surface to reproduce the image of the template on the workpiece. The template is formed of a suitable metal, such as copper or brass. With such metal templates there are certain limitations, one such limitation being the amount of detail which can be formed therein. With stenciling the basic means of forming such templates, where it is desired to form fine lines in the finished image, the structural stability of a fine strand of metal in the template creates a limiting factor. In addition, when fine lines exist in the template, twisting or warping, or bending may occur during handling and use of the template. As a further limitation, since metal is normally employed in the template, as the laser beam is scanned thereover, heat is generated as well as smoke as the exposed portions of the workpiece vaporize. With the occurrence of smoke, condensed smoke darkens the metal surface, causing the template to become absorbent. This, in turn, produces rapid heating and cooling when struck by the laser beam, with this thermal working of the metal ultimately distorting the template so that it has a limited useful life.

Another method sometimes used for laser engraving involves a modulation approach in which the workpiece is scanned with an electrically modulated laser beam, with the beam being turned on and off to provide a point-by-point resolution of the desired image. This approach has an economic drawback due to the complexity of modulation equipment, which corresponds to more expense. In addition, present modulation mechanisms for use with carbon dioxide laser apparatus do not permit a high enough modulation frequency to be achieved for mass production of rapidly scanned items, such as paper products.

Non contact laser engraving apparatus has heretofore been utilized in engraving objects made of wood. One such apparatus is shown and described in U.S. Pat. No. 4,156,124 issued to the inventor entitled "Image Transfer Laser Engraving". In the apparatus of this patent, the laser beam and the optics remain stationary relative to each other while the template and workpiece are moved synchronously.

It is an object of the present invention to provide a new and improved laser apparatus.

It is another object of the present invention to provide a new and improved apparatus and method for laser engraving of products such as wood and paper.

It is still another object of the present invention to provide a new and improved laser apparatus and method for achieving nonstencilled laser engraving at good resolution inexpensively.

It is a further object of the present invention to provide laser engraving apparatus using a cylindrical mirror having a diffusely reflecting artwork image formed thereon or in proximate relation thereto.

SUMMARY OF THE INVENTION

The foregoing and other objects of the invention are accomplished by providing a laser apparatus emitting a laser beam with scanning means in the form of a scanning mechanism intercepting the beam for scanning along a line. The scanned beam is directed at a mirror having a cylindrical reflecting surface with a diffusely reflecting artwork image adjacent thereto, or on the surface thereof, the reflected beam then passing to other optical devices for providing a focused spot at the surface of the workpiece. Translation mechanisms are provided for providing motion to the workpiece relative to the image in a direction orthogonal to the scan line for reproducing the image on the workpiece. Three embodiments of the apparatus are described for achieving this result.

Other objects, features and advantages of the invention will become apparent when reading the specification, when taken in conjunction with the drawings, in which like reference numerals refer to like elements in the several views.

BRIEF DESCRIPTION OF THE DRAWINGS

FIG. 1 is a diagrammatic side view of laser engraving apparatus according to the invention with the cylindrical mirror thereof shown in perspective;

FIG. 2 is an inverted perspective view of the cylindrical mirror used in the apparatus of FIG. 1;

FIG. 3 is a diagrammatic side view of an alternate embodiment of the apparatus of FIG. 1 with componenets thereof shown in perspective view for ease of illustration; and FIG. 4 is a diagrammatic side view of an alternate embodiment of the apparatus of FIG. 1 utilizing mirrors as the primary optical elements.

DESCRIPTION OF THE PREFERRED EMBODIMENT

Referring now to the drawings, and particularly to FIGS. 1 and 2, there is shown a laser engraving apparatus according to the invention, the apparatus including a laser source 10 emitting a laser beam 12 which is intercepted by the focusing lens 14 and directed at a scanning mirror 16 driven by a scanning mechanism 18. The mirror 16 is scanning back and forth along a line generally perpendicular to the plane of the drawing. The focused scanning laser beam then strikes a cylindrical mirror 20 which has formed thereon or adjacent thereto an image of reduced specular reflectivity formed in a manner to be discussed in more detail hereinafter.

The mirrored surface of mirror 20 and the artwork are both facing downward as viewed in FIG. 1. In practice, the axis of the cylindrical mirror 20 is perpendicular to the scanning direction of the laser beam. A translating mechanism 22 is coupled to the mirror 20 for moving the mirror 20 in a direction generally parallel to the mirror axis, and therefore in a direction orthogonal to the scan line. The position of lens 14 and mirror 20 is such that the laser light is concentrated to a high enough power density that clean vaporization of the workpiece results. This generally requires that the laser beam be focused at the surface of the mirror 20. From the mirror 20, the scanned laser beam is directed through a focusing lens 24 to a spot on the surface of the workpiece 26. The workpiece 26 is moved in a plane parallel to the plane of movement of the mirror 20 by a suitable translating mechanism, the movement of which would be controlled in relation to the movement of the mirror 20, that is in some known or predetermined ratio. The radius of curvature and angular orientation of the mirror 20 is chosen so that light which has reflected off the scanning mirror 16 will pass approximately through the center of lens 24 with little or no displacement. In the apparatus of FIG. 1, the workpiece 26 is translated by mechanism 28 in the opposite direction of motion of the cylindrical mirror 20 and at a speed which accomplishes tracking of the optical image on the mirror 20.

Referring now to Fig. 2, the details pertaining to the cylindrical mirror and the artwork image will be described. In FIG. 2, the cylindrical mirror 20 has been rotated to show the partly mirrored surface which in FIG. 1 was facing downward. In FIG. 2 it can be seen that this mirrored surface contains a suitable image 30 which is desired to be reproduced on the workpiece 26. Preferably, the mirror is formed of a metal having a mirrored surface on the concave portion thereof that is highly reflective. The artwork image 30, on the other hand is formed in some manner to provide a diffusely reflective or absorbent image pattern, which can be done by any one of a number of conventional techniques. In the simplest form, the image 30 may be formed by applying paint to the mirrored surface of mirror 20 to provide an image area having specular reflectivity much less than that of the mirrored surface therearound.

By way of example, if black paint were used for the artwork to form the image 30, the light from a scanning laser beam striking the artwork would be absorbed by the black paint and turned into heat. This heat in turn would have to be dissipated by the mirror structure. A scanning laser beam striking other sections of the mirror 20 which were not painted would be specularly reflected to pass through the center of lens 24, the point in the optical system where the scanning displacement has been eliminated. In contrast to the use of black paint, if white paint were utilized, a different principle would apply. The white paint selected would be diffusely reflecting at the wavelength of the laser employed. In this case, the scanning laser beam, when striking the white-painted image 30, would not be absorbed, but instead would be diffusely reflected while the light impinging on the unpainted mirrored surface of the mirror 20 would be specularly reflected.

Since only light which passes through lens 24 will be concentrated and imaged on the workpiece, lens 24 is a limiting aperture in the optical system. The basic philosophy of this design approach is to have the light required for engraving pass through lens 24 while rejecting other light. All light specularly reflected from this concave mirror is designed to pass through lens 24 while light diffusely reflected will be scattered with only a small amount passing through lens 24 thereby producing the desired contrast. Diffusely reflected light from areas 30 on mirror 20 will produce little or no vaporization on workpiece 26.

However, paint as a medium for the artwork image 30 has certain limitations. Ordinarily, in an engraving apparatus of the type heretofore describred, a carbon dioxide laser having power in excess of 100 watts will be employed, in which event the paint itself may be vaporized by the laser beam 12 focused on the mirror 20. Under these conditions, paint as a medium for the image 30 is not optimum. Preferably the mirror 20 is formed of metal such as aluminum polished to provide a specular surface with an anodized layer on the mirrored surface as the absorbing layer for the 10.6 micrometer wavelength of the carbon dioxide layer. The anodized image 30 may be readily formed with an anodizing process utilizing chemical or photographic techniques, to provide detail and resolution to the image not readily obtainable with stencilled templates.

Alternatively the image 30 may be formed on the surface of the mirror 20 by selectively roughening the mirrored surface thereof. For example, sandblasting a metal mirror surface 20 through a mask containing the artwork would result in the desired roughening of the metal reproducing the image 30 from the mask. In addition, with conventional techniques, it is possible to produce a diffusely reflecting surface in metal utilizing chemical etching methods. Although it is preferable that the artwork image 30 be applied directly to the surface of the concave cylindrical mirror 20, the image 30 could, in fact, be contained on some other material held or affixed close to the mirror taking into consideration the optical requirements, that is the necessity for the laser beam to pass through areas around the image. As can be seen, there are numerous methods of creating the image in proximate relation to, or on the surface of the mirror 20.

With respect to the apparatus of FIG. 1, with an artwork image 30 formed on, or in proximate relation to the mirror 20 there can be derived certain relationships between the parts. By defining the following parameters, let:

B = the optical path length between scanning mirror 16 and cylindrical mirror 20;
C = the optical path length between mirror 20 and lens 24;
D = the optical path length between lens 24 and workpiece 26;
Z = the focal length of lens 24;
R = the radius of curvature of cylindrical mirror 20;
V = the translation velocity of mirror 20;
W = the translation velocity of workpiece 26;
G = the area of laser beam at the mirror 20;
P = the laser power;
M = the critical laser power density required to clearly vaporize or suitable work the workpiece 26.

Then presuming that the laser beam 12 is parallel, the following mathematical relations should be approximately maintained:

$$\frac{2}{R} = \frac{1}{B} + \frac{1}{C}$$

$$\frac{1}{Z} = \frac{1}{C} + \frac{1}{D}$$

$$V \times D = -W \times C$$

-continued
$$\frac{P}{G} > \frac{DM}{C}$$

In the preferred embodiment of this optical layout, the following relations are desirable;
B=C=D=R=2Z
V=-W
Y=the optical path length between lens 14 and reflecting mirror 20.

To illustrate some of the intricacies of this design according to the invention, numerical examples of the physical sizes of the components are as follows. If:
B=C=D=R=2Z=50 cm.
Diameter of the laser beam 12=2 cm.
Diameter of lens 24=5 cm.
Laser Power=1,000 watts at 10.6 micron wavelength
Critical laser power density=30,000 watts/cm²
Area of focused laser beam at mirror 20=0.18 cm²

If the artwork image 30 is 10 centimeters wide, then mirror 20 would have to scan through an angle of plus or minus 2.85° in order that light reflected from this mirror would scan through angles of plus or minus 5.7° in order to cover the full 10 centimeter width of the artwork image 30. Since the scanning mirror 16 is located in this example on the axis of the cylindrical mirror 20, the light specularly reflected off the cylindrical mirror 20 loses its scanning displacement motion when it returns to a point on the axis of the cylindrical mirror 20. As illustrated in FIG. 1, this occurs at the center of the lens 24. At this point, the laser beam has once more enlarged to its original diameter of two centimeters, with lens 24 being five centimeters in diameter. However, it should be noted that the edges of the artwork forming the image 30 diffract the light at angles outside the geometric cone, and the majority of this diffracted light must be captured in order to provide good resolution to the image to be engraved in the workpiece 26. It is to be emphasized that the resolution obtainable in this example is a spot size more than 1,500 times smaller in area than the laser spot size, thus illustrating the parallel processing of information occurring in this optical design.

In the preceding numerical example, lens 24 intercepts a cone of light with an "f" number of 10. If the artwork image 30 is diffusely reflecting, then some light form this artwork will be captured by the lens 24. However, in the case of diffuse reflection, an F10 lens only captures about 1/300th of the light which is otherwise sent through the lens 24 by specular reflection. Therefore, it is obvious that it is possible to achieve a very great difference in the light passed on to the workpiece 26, even with the artwork image 30 being diffusely reflecting.

Continuing on with the numerical illustration of the apparatus of FIG. 1, the translations speed in opposite directions for the mirror 20 and the workpiece 26 would be about 2 millimeters per second if the workpiece was walnut wood and the desired depth of cut was 1.5 millimeters. If, on the other hand, the workpiece 26 was paper approximately 0.01 centimeters thick, then the translation speed would be 2.5 centimeters per second to cut entirely through the paper. In the above example, if the laser beam were focused to a spot size of 1.5 millimeters in diameter at the surface of the cylindrical mirror 20, then the minimum desirable scan time for a workpiece 26 of walnut would be 3 cycles per second, while using paper as the workpiece would result in about 40 cycles per second. In practice, faster scan rates are preferable. These scan rate numbers are set by the requirement that it is desirable for the scans to overlap by at least one-half the diameter of the laser beam. In this example, it is presumed that the scanning motion is linear in both directions. It is to be noted that although the discussion herein proceeds with reference to a "cylindrical" mirror, a slice of a sperical mirror may be utilized inasmuch as the actual portion of the mirror in use can be considered cylindrical. In this instance, however the diameter of the spherical mirror would have to be taken into consideration as well as the effective area of the mirror to be utilized to insure the mathematical elationships given.

FIGS. 3 and 4 illustrate laser apparatus embodiments which may be employed within the teachings of the instant invention. Referring first to FIG. 3, there is shown a laser apparatus in which the mirror 20 and the workpiece 26 are mounted to a subassembly to provide simultaneous translation of both parts in the same direction using one translation mechanism, and thus somewhat simplifying the apparatus. In this figure, the parts which have corresponding parts in FIG. 1 are similarly numbered. The laser source 10 emits a laser beam 12 toward a focusing lens 14 which directs the beam to the scanning mirror 16 driven by a scanning mechanism 18, the mirror 16 then providing a linear scan of the laser beam at the cylindrical mirror 20. The mirror 20 and the workpiece 26 are suitably attached to a table 25 in proper alignment relative to one another for reproducing the image 30 on mirror 20 on the workpiece 26. The beam is reflected, partially specularly and partially diffusely, from the surface of the mirror 20 to be redirected by a folding mirror 32 through a lens 34 to another folding mirror 36 toward the workpiece 26. The folding mirrors 32 and 36 are flat mirrors, that is generally planar in configuration, at least at the reflecting surface. The mirror 32 and 36, in addition to accomplishing the result of redirecting the laser beam, also accomplish an inversion of the image projected so that the workpiece 26 and the cylindrical mirror 20 may be located in the same plane and simultaneously translated in the same direction by the translating mechanism 38 coupled to the plate or table 25 to which the parts are attached.

Functionally, since there is scanning occurring in the plane perpendicular to the plane of the drawing, mirrors 32 and 36 should be sufficiently wide in this direction to intercept the beam at the extremes of the scan movement. By comparison of the apparatus of FIGS. 1 and 3, it can be seen that the apparatus of FIG. 3 is analogous to the apparatus of FIG. 1. For example, lens 14 in FIG. 3 is analogous to the lens 14 in FIG. 1 while the scanning mechanisms 18 and scanning mirrors 16 are analagous, with the cylindrical mirror 20 in both instances being the same. Lens 34 corresponds to lens 24 with the exception being in the two apparatuses in the elimination of one translating mechanism 22 and the additional of two folding mirrors 32 and 36. However, with the elimination of the mechanism 22 and the geometric image inversion accomplished by the folding mirrors 32 and 36, image tracking by simultaneous translation of both the mirror 20 and the workpiece 26 resolves a major consideration in laser engraving, that is tracking. The translation occurs in the direction orthogonal or perpendicular to the line of scan, that is from right to left or from left to right as viewed in FIG. 3, with the line of scan being in a direction perpendicular to the plane of the drawing.

One difference between FIG. 1 and FIG. 3 is that in FIG. 3 the common translative mechanism necessitates a one-to-one image size from 20 to 26. This in turn requires that the optical path link from 20 to 34 be equal to the optical path link from 34 to 26. Also, both of these differences should be equal to twice the focal length of lens 34. Oftentimes, in laser engraving apparatus lenses are undesirable due to their limited power handling abilities and fragile nature. It is thus desirable to use only reflective elements. One such apparatus employing the techniques of the present invention is shown in FIG. 1, which retains the essential features of the apparatus of FIG. 1. Those components in FIG. 4 which are structurally and functionally identical bear the same reference numerals. The beam 12 emitted from the laser source 10 is directed at a mirror 40, which is a concave spherical scanning mirror driven by scanning mechanism 42 to a line scan in a direction perpendicular to the plane of the drawing. The mirror 40 is also a focusing optical device, which essentialy takes the place of lens 14 and scanning mirror 16 in the apparatus of FIG. 1. From the surface of the mirror 40 the beam is bent or redirected by a planar folding mirror 44 to the surface of the cylindrical mirror 20 (with the image 30 thereon), at which point the laser beam is in focus at this surface and scanning in a direction perpendicular to the plane of the drawing. From the surface of mirror 20 the beam is redirected to another folding mirror 46 to a concave spherical focusing mirror 50 which redirects the beam to a third folding mirror 48 from where the beam is redirected toward the workpiece 26. The workpiece 26 is being translated in a plane parallel to the plane of the translation of the mirror 20, similar to FIG. 1, but with one notable exception. That is that the workpiece 26 and the mirror 20 are being translated in the same direction due to the geometric inversions accomplished by the folding mirrors 46 and 48. As in the other apparatus of FIGS. 1 and 3, the workpiece 26 is in the image plane of the artwork on cylindrical mirror 20.

In the apparatus of FIG. 4, it is desirable that the optical path length between cylindrical mirror 20 and mirror 50 be equal to the optical path length between the workpiece 26 and the mirror 50. Further, both of these distances should equal the radius of curvature of both mirror 50 and cylindrical mirror 20. Within these constraints, there is very little spherical aberration introduced by mirror 50 as long as the angle between the incident and reflected beam on mirror 50 is kept as narrow as possible. The reason for this is that the spherical reflector is the ideal optical surface for imaging a point on itself located at the center of the sphere. The imaging which occurs in the apparatus of FIG. 4 attaempts to keep both the image and the object as close as possible to the center of the spherical surface of mirror 50.

It should be obvious to those skilled in the art that the mathematical relationships previously discussed relative to the apparatus of FIG. 1 apply equally to the apparatus of FIGS. 3 and 4. When these relationships deviate substantially from the one-to-one ratio previously discussed, it may be necessary to change spherical reflector or mirror 50 to an elliptical reflector of the appropriate configuration.

In accordance with the present invention various embodiments have been shown and described for providing non-contact laser engraving with an artwork image means located at a point remote from the workpiece for avoiding some of the disadvantages of stencilled templates. Additionally, with the present invention artwork image formation my be readily accomplished using high resolution chemical etching and photographic techniques to provide good detail in the artwork with corresponding good resolution in the engraved workpiece.

While there have been shown and described preferred embodiments, it is to be understood that various other adaptations and modifications may be made within the spirit and scope of the invention.

I claim:

1. In a laser engraving apparatus, the combination comprising:
    means for emitting a laser beam;
    means for scanning said laser beam;
    a generally cylindrical mirror, said mirror having a curvature, orientation and position such that the scanned laser beam strikes the mirror and reflects to an area in space where the translation of the scanned laser beam has been eliminated;
    an artwork image means of reduced specular reflectivity in at least proximate relation to the reflecting surface of said mirror;
    a workpiece; and
    a first focusing means positioned between the artwork means and the workpiece to image the artwork at the surface of the workpiece, said focusing means being positioned at or near the area in space where the translation of the scanned laser beam has been eliminated, said so-focused laser beam having sufficient power to suitably physically change said workpiece.

2. The combination according to claim 1 wherein said apparatus includes a second focusing means located between the laser and the curved reflector to concentrate the laser beam on the surface of the curved reflector.

3. The combination according to claim 2 wherein said scanning means scans said beam along a given line and said apparatus further includes means for providing relative translational movement of at least one of said reflecting means and said workpiece in a direction generally perpendicular to the scan line.

4. The combination according to claim 3 wherein said cylindrical mirror and said workpiece lie in generally parallel planes.

5. The combination according to claim 2 wherein said first and second focusing means include at least one of mirrors and lenses.

6. In a method for engraving an image in a workpiece using a laser beam, the steps comprising:
    providing a laser beam source;
    scanning the laser beam along a given line in a first direction;
    focusing the scanned laser beam to a point in a first plane; positioning cylindrical mirror means in said first plane, said cylindrical mirror means having artwork image means in at least proximate relation to the reflecting surface of said cylindrical mirror means;
    focusing the laser beam reflected from said cylindrical mirror means to a point in a plane at the surface of the workpiece, with said workpiece and said generally cylindrical mirror means generally lying in the same plane; and
    providing relative translational movement for at least one of said cylindrical mirror means and said workpiece in a direction orthogonal to the line of scan of the laser beam.

7. The method of claim 6 wherein at least one of said focusing steps includes inverting the image from said artwork image means.

8. In a laser engraving apparatus, the combination comprising:

means for emitting a laser beam;

means for scanning said laser beam along a given line;

a generally cylindrical mirror, said mirror having a curvature, orientation and position such that the scanned laser beam strikes the mirror and reflects to an area in space where the translation of the scanned laser beam has been eliminated;

an artwork image means of reduced specular reflectivity in at least proximate relation to the reflecting surface of said mirror;

a workpiece lying in a common plane with said mirror on a table means;

a first focusing means positioned between the artwork means and the workpiece to image the artwork at the surface of the workpiece, said focusing means being positioned at or near the area in space where the translation of the scanned laser beam has been eliminated, said so-focused laser beam having sufficient power to suitably physically change said workpiece;

a second focusing means located between the laser and said mirror for concentrating the laser beam on the surface of said mirror; and means for providing relative translational movement of said workpiece and said mirror simultaneously in a direction generally perpendicular to the scan line.

9. In a laser engraving apparatus, the combination comprising:

means for emitting a laser beam;

means for scanning said laser beam along a given line;

a generally cylindrical mirror, said mirror having a curvature, orientation and position such that the scanned laser beam strikes the mirror and reflects to an area in space where the translation of the scanned laser beam has been eliminated;

an artwork image means of reduced specular reflectivity in at least proximate relation to the reflecting surface of said mirror;

a workpiece lying in a plane generally parallel with the plane of said mirror;

a first focusing means positioned between the artwork means and the workpiece to image the artwork at the surface of the workpiece, said focusing means being positioned at or near the area in space where the translation of the scanned laser beam has been eliminated, said so-focused laser beam having sufficient power to suitably physically change said workpiece;

a second focusing means located between the laser and said mirror for concentrating the laser beam on the surface of said mirror, at least one of said first and second focusing means including optical means for providing image inversion; and means for providing relative translational movement of said workpiece and said mirror in the same direction in a direction generally perpendicular to the scan line.

10. In a method for engraving an image in a workpiece using a laser beam, the steps comprising:

providing a laser beam source;

scanning the laser beam along a given line in a first direction;

focusing the scanned laser beam to a point in a first plane;

positioning cylindrical mirror means in said first plane, said cylindrical mirror means having artwork image means in at least proximate relation to the reflecting surface of said cylindrical mirror means;

positioning a workpiece in a plane generally parallel to said first plane;

focusing the laser beam reflected from said cylindrical mirror means to a point in a plane at the surface of the workpiece; and providing relative translational movement for at least one of said cylindrical mirror means and said workpiece in a direction orthogonal to the line of scan of the laser beam.

11. The method of claim 10 wherein said step of providing relative translational movement includes moving said cylindrical mirror means in a direction opposite to the direction of movement of said workpiece.

12. The method of claim 10 wherein said step of providing relative translational movement includes moving said cylindrical mirror means in the same direction of movement of said workpiece.

* * * * *

UNITED STATES PATENT AND TRADEMARK OFFICE
CERTIFICATE OF CORRECTION

PATENT NO. : 4,480,169
DATED : October 30, 2984
INVENTOR(S) : John A. Macken

It is certified that error appears in the above-identified patent and that said Letters Patent is hereby corrected as shown below:

Column 8, line 35, "curved reflector" should read -- mirror --.

Column 8, lines 36 and 37, "curved reflector" should read -- mirror --.

Column 8, line 42, "reflecting means" should read -- mirror --.

Signed and Sealed this

Thirtieth Day of April 1985

[SEAL]

Attest:

DONALD J. QUIGG

*Attesting Officer*  *Acting Commissioner of Patents and Trademarks*